United States Patent Office 3,007,765
Patented Nov. 7, 1961

3,007,765
DRAWING AND FILAMENTING TREATMENT
OF CRYSTALLINE POLYMERS
Klaas Ruyter, Amsterdam, Netherlands, assignor to
Shell Oil Company, a corporation of Delaware
No Drawing. Filed Feb. 26, 1958, Ser. No. 717,579
Claims priority, application Netherlands Mar. 5, 1957
8 Claims. (Cl. 18—54)

This invention relates to improvements in the drawing treatment of highly crystalline polymers of olefinically unsaturated compounds. The invention relates more particularly to improvements in the production of fibrous highly crystalline polymeric materials of improved properties.

In the production of certain polymeric materials it is often found advantageous to subject the polymer to a treatment adapted to produce partial or complete orientation of the molecules in a given direction. Such treatments include those known in the industry as "drawing" in which the polymer is subjected to sufficient tension to result in a permanent increase in the length. Drawing has heretofore been applied with advantage to polymeric materials of predominantly amorphous character or those of low crystallinity. Attempts at drawing highly crystalline polymeric materials however, has heretofore generally not resulted in products of satisfactory characteristics. Thus, though the drawing of a highly crystalline polyethylene at 95° C. in a medium such as glycerol, or water, does improve to some extent certain properties such as resistance to aging, the resulting product is nevertheless devoid of characteristics essential to its use in many important fields of application. Highly crystalline polymer drawn by methods disclosed heretofore, for example, does not lend itself readily to conversion to fine filamentary form, and therefore cannot be converted to a voluminous fibrous mass in which form it would be useful as insulating material, and the like.

The conversion of the drawn polymer to a fine filamentary state is referred to herein as "filamenting." Filamenting includes suitable mechanical treatment such as, for example, beating to effect splitting into elementary filaments or fibers.

It is an object of the present invention to provide an improved process enabling the more efficient drawing treatment of highly crystalline polymers of olefinically unsaturated compounds.

Another object of the invention is the provision of an improved process enabling more efficient conversion of highly crystalline polymers of olefinically unsaturated compounds to drawn polymer particularly suitable for filamenting.

Still another object of the invention is the provision of an improved process enabling the more efficient drawing of highly crystalline polyethylene.

A more particular object of the invention is the provision of an improved process enabling the more efficient drawing of highly crystalline polypropylene. Other objects and advantages of the invention will become apparent from the following detailed description thereof.

In accordance with the invention a highly crystalline polymer of an ethylenically unsaturated compound is converted to a drawn polymer, particularly suitable for filamenting, by drawing said polymer at a temperature lying in the softening range of said polymer while in a medium having a solubility parameter of from about 5 to about 8 at the drawing temperature. The term "solubility parameter" as used in the present specification and attached claims is intended to have the meaning defined as set forth in "Modern Plastics," vol. 33, May 1956, pp. 121–130. As explained therein, the solubility parameter is the square root of the cohesive energy density. This is a measurement of the attraction of molecules for each other and quantitatively it is the amount of energy required to vaporize one cubic centimeter of a liquid. Thus, nonpolar molecules such as methane evaporate readily and have a comparatively low solubility parameter while highly polar molecules such as water require high heat input to evaporate and have a very high solubility parameter. The values for solubility parameter may be calculated from the following equation:

$$\text{Solubility parameter} = \sqrt{\frac{\rho}{M}(\Delta H - RT)}$$

where $\Delta H$=latent heat of vaporization in cal./mole; $R$=gas constant (1.987 cal./mole, ° K.); $\rho$=density in g./cc.; $M$=gram-molecular weight in g./mole; and $T$=absolute temperature in ° K.

The polymers to which the invention is applied comprise the broad class of highly crystalline polymers and co-polymers of ethylenically unsaturated compounds. These include, for example, the highly crystalline polymers of ethylenically unsaturated hydrocarbons having one or more double bonds, such as, for example, ethylene, propylene, the butylenes, etc.; the diolefins, such as, butadiene, methylpentadiene, etc.; their homologues etc. By the term "highly crystalline polymers" as used in the present specification and attached claims is meant the polymers having a crystallinity of at least 65% and preferably at least 75%, the rest of the polymer being substantially amorphous. The suitable type of polymers comprise those referred to in the art as "low-pressure polymers" and "Ziegler-type polymers."

The highly crystalline polymers to the treatment of which the present invention is directed, comprise polymers of alpha-olefins obtained by polymerizing alpha-olefins at low pressures, that is below about 500 atm., and preferably below about 500 lbs., at temperatures of from about ambient to about 120° C. in the presence of a low-pressure olefin polymerization catalyst. The term "low-pressure olefin polymerization catalysts" as used in the present specification and attached claims is intended to mean the catalysts heretofore indicated as effective in catalyzing alpha-olefins at pressures below 500 atm. These include catalysts of one of the following groups I through IV inclusive:

(I) The product formed by mixing at least one compound of a metal of groups IV to VI, inclusive, of the periodic table, for example, the halides, e.g., $TiCl_4$ and/or $TiCl_3$, with at least one of the following compounds:

(a) An aluminum trialkyl compound such as, for example, aluminum triisobutyl.

(b) An aluminum compound of the general formula $R_1R_2AlX_1$, wherein $R_1$ and $R_2$ are similar or dissimilar and each represent hydrogen or a hydrocarbon radical, and X represents a member of the group consisting of hydrogen, halogen, an alkyloxy or aryloxy group or the residue of a secondary amine or amide, mercaptan, thiophenol, carboxylic acid or sulphonic acid;

(c) Magnesium and zinc alkyls or Grignard compounds.

(II) The product formed by mixing a metal belonging to group VIII of the periodic table such as nickel, cobalt, platinum, or manganese with an aluminum compounds of the general formula $R_1R_2AlHal$ wherein $R_1$ and $R_2$ have the same meaning indicated in the foregoing paragraph I(b) and Hal signifies halogen, e.g., chloride, etc.;

(III) The products obtained by reacting a compound of a metal of groups IV, V, VI and VIII of the periodic table and manganese with a compound capable of reducing said metal compounds.

(IV) The products obtained by reacting together AlCl₃, aluminum or an alkali metal such as potassium and titanium trichloride and/or titanium tetrachloride.

Highly crystalline polymers of the above-defined type treated with particular advantage in accordance with the invention comprise:

(A) Polyethylene, often referred to as Ziegler-type polyethylenes, characterized by being composed of substantially unbranched or straight-chain molecules—i.e. having less than three methyl groups per 100 methylene groups—a molecular weight of from about 10,000 to about 500,000 or more as determined by standard viscosity methods, and having a relatively high softening point—i.e. a softening point which is higher than that of the ethylene polymers produced at high pressures above 500 atm., and (B) Polypropylene obtained by the polymerization of propylene under the above-defined low-pressure olefin polymerization conditions in the presence of a low-pressure olefin polymerization catalyst. Particularly suitable polypropylenes comprise those having a crystallinity of 90% and higher, the rest of the polymer being substantially amorphous. Polypropylene having a desirable property of high crystallinity is obtained by the method described and claimed in co-pending application Serial No. 704,274, filed December 23, 1957.

Comprised within the highly crystalline polymers treated in accordance with the invention are the co-polymers of high crystallinity obtained by co-polymerizing two or more of said olefinically unsaturated compounds or by co-polymerizing said olefinically unsaturated compounds with lesser amounts of other monomers co-polymerizable therewith to highly crystalline co-polymers.

The highly crystalline polymers of olefinically unsaturated compounds defined above are drawn, or stretched, in accordance with the invention in a liquid medium having a solubility parameter in the range of from about 5 to about 8 (defined in "Modern Plastics," vol. 33, pp. 121–130, May 1956) at the drawing temperature. In the case of polymers of ethylenically unsaturated hydrocarbons, such as polyethylene, this parameter is approximately equal to that of the amorphous portion of the polymer and usually lies between about 6 and about 7. Suitable liquids comprised in the above-defined class comprise the compounds represented by the general formula R₁X, wherein X represents hydrogen, —OH, —OR₂, or

wherein R₁, R₂ and R₃ represent hydrocarbyl radicals which may or may not be further substituted by halogen, such, as for example, chlorine, bromine, etc. In the foregoing formula R₁, R₂ and R₃ are preferably the same or dissimilar aliphatic hydrocarbyl radicals. Preferred liquids comprised within the above-defined class are those having a boiling temperature in the range of from about 120° to about 200° C. Examples of such suitable liquids include the paraffins such as octane; the non-aromatic hydrocarbon fractions, such as non-aromatic white spirit; esters, such as the alkyl esters of monocarboxylic acids, as butyl acetate; iso-amyl acetate; ethers such as the alkyl ethers as di-n-butyl ether; their homologues; etc. The liquid medium employed may consist of one of such liquids or of a mixture of two or more of the defined liquids.

The drawing of the highly crystalline polymers in the liquid medium is carried out at a temperature which lies in the softening range of the polymer being treated. In general it is preferred to effect the drawing at a temperature in the range of from about 100° to 150° C., still more preferably from about 120° to about 140° C. This may be done at sub-atmospheric, atmospheric or super-atmospheric pressures. In general the use of substantially atmospheric pressure is satisfactory. Pressures somewhat above atmospheric are, however, at times preferably resorted to, to aid in maintaining the liquid medium in the liquid state.

The degree to which the polymer is drawn will depend to some extent upon the specific polymer being treated, the characteristics specifically desired and the use to which it is to be put. The polymer is generally drawn to obtain a stretching of from about 500 to about 1,500%. Higher or lower degrees of elongation may however be obtained within the scope of the invention. In general it is desirable to effect the desired degree of drawing within a space of time assuring no substantial degree of solubilization of polymer in the liquid medium employed.

The stretching or drawing of the polymer may be carried out in conventional equipment capable of subjecting the polymer to the desired stress in the liquid medium. The polymer to be drawn, or stretched, may be in any suitable solid form such as, for example, a bar, tube, rod, thread, strips, etc., which is capable of being drawn. The invention is not limited in its scope by the type of cross-sectional area the polymer is in when subjected to the drawing operation in accordance with the invention. The polymer to be drawn may be shaped, extruded, or the like, by conventional means prior to being drawn under the conditions defined herein.

It is found that subjection of the highly crystalline polymer to the drawing treatment in accordance with the invention results in the obtaining of highly crystalline polymer of highly desirable characteristics comprising, for example, improved resistance to aging; improved retention of elasticity, even at exceedingly low temperature, for example, about —100° to about —200° C.

The invention is not limited with respect to the specific form in which the drawn polymer is obtained in accordance with the invention. Thus the polymer may be subjected to the treatment in accordance with the invention to obtain improved properties whatever its subsequent use is to be. The drawn polymer may be used as such, for example, in the form of drawn thread or filament, or it may be converted to suitable staple by subjection to conventional cutting or other means. The drawn polymer, if in form of thread or filament, may be spooled, spun, or subjected to other conventional mechanical treatment.

A particular advantage of the invention, however, resides in its ability to impart to the polymer, during the drawing process, the characteristic of being readily converted to elementary filaments or fibers by suitable filamenting procedures. Such filamenting procedures may comprise conventional methods of beating, splitting and the like, resulting in the conversion of the polymer to a fine filamentary fibrous form suitable for use as a voluminous mass. The drawn polymer may be subjected to suitable mechanical processing, if this should be desired, such as, for example, cutting, and the like, prior to being subjected to the filamenting treatment. The highly crystalline polymeric fibrous mass so obtained after filamenting is particularly suitable for use as insulating material, packing material, the manufacture of paper, etc. It is substituted with advantage for all or a part of conventional cellulose fibers in applications wherein such cellulose fibers are generally employed.

The following examples are illustrative of the invention:

EXAMPLE I

A highly crystalline polyethylene polymer having a molecular weight of approximately 80,000 and a softening range of 120° to 140° C. was prepared by polymerizing ethylene at a temperature in the range of ambient to 120° C. in the presence of a low-pressure olefin polymerization catalyst as defined above. The polymer thus obtained was white and opaque, and had a crystallinity above 65% as determined by solubility in boiling heptane. In a plurality of experiments a rod of the polymer having a length of 50 mm., a width of 5 mm., and a thickness of 0.8 mm. was drawn to an elongation of about 1,000%. The drawing operation lasted approximately one second. The drawing was carried out in a liquid medium at elevated temperature. The drawn polymer was then stretched slightly in air. The drawn polymer was then filamented in a beating operation. The liquid and temperature used in each experiment as well as results obtained in terms of filamenting capacity are set forth in the following Table I:

Table I

| Liquid medium | Boiling point of liquid medium, °C. | Solubility parameter at boiling point of liquid medium | Drawing temperature, °C. | Filamenting capacity |
|---|---|---|---|---|
| White spirit (Free from aromatics). | 150-200 | Approx. 7.0 | 135 | Good. |
| Butyl acetate | 126.5 | Approx. 7.4 | 126.5 | Good. |
| Di-n-butyl ether | 142 | Approx. 6.7 | 130 | Excellent. |
| Iso-amyl acetate | 142.5 | Approx. 7.3 | 130 | Good. |
| n-Octane | 126 | Approx. 6.7 | 125 | Excellent. |
| Xylene | Approx. 140 | Approx. 8.0 | 125 | Moderate. |

For the purpose of comparison the experiment was repeated in a plurality of operations in which liquid media not falling within the scope of the invention were used as the liquid medium in which the polymer was drawn. The liquid media used, drawing temperature and results obtained are set forth in the following Table II for each operation.

Table II

| Medium | Boiling point in °C. | Solubility parameter at boiling point | Stretching temperature in °C. | Filamenting capacity |
|---|---|---|---|---|
| Glycerol | 290 | Approx. 12.0 | 130-135 | Poor. |
| Water | 100 | Approx. 21.0 | 80 | Do. |
| White spirit (Free from aromatics). | 150-200 | Approx. 7.0 | 74 | Do. |
| White spirit (Free from aromatics). | 150-200 | Approx. 7.0 | 103 | Do. |
| 1,2-Dibromoethane | 131.6 | Approx. 10.0 | 131 | Do. |
|  |  |  | 131 | Do. |
| Mercury | 357 |  | 130 | Do. |

Similarly highly crystalline, drawn polypropylene having good to excellent filamenting capacity is obtained by the procedure illustrated in the following example:

EXAMPLE II

A polypropylene polymer is prepared by polymerizing propylene in n-heptane at approximately 35° C. and a pressure of about 5 p.s.i.g. in the presence of a low-pressure polymerization catalyst consisting essentially of the reaction product of diethyl aluminum chloride and titanium trichloride. The polymer will have a crystallinity of about 76% and a melting range of 144° to 147° C. A 50 mm.-length bar of approximately 5 mm. width and 1 mm. thickness is drawn at a temperature of 145° C. in n-decane to an elongation of approximately 1,000%. Upon subjecting the drawn polymer to filamenting it is found to have good to excellent filamenting capacity.

Similarly substituting for the n-octane butyl acetate, xylene and di-n-butyl ether in the drawing operation, drawn polypropylene having moderate to excellent filamenting capacity is obtained.

The invention claimed is:

1. The process for converting a highly crystalline polyethylene to a fine filamentary fibrous mass which comprises drawing and stretching a solid body of said polyethylene at a temperature of from about 100° to about 150° C. in a liquid medium having a solubility parameter of from about 5 to about 8 at said drawing temperature, and thereafter subjecting the drawn polymer to a filamenting operation.

2. The process for converting a highly crystalline polypropylene to a fine filamentary fibrous mass which comprises drawing and stretching a solid body of said polypropylene at a temperature of from about 100° to about 150° C. in a liquid medium having a solubility parameter of from about 5 to about 8 at said drawing temperature, and thereafter subjecting said drawn polymer to a filamenting operation.

3. The process for converting a highly crystalline polymer selected from the group consisting of polyethylene and polypropylene to a fine filamentary fibrous mass which comprises drawing and stretching a solid body of said highly crystalline polymer at a temperature of from about 100 to about 150° C. in a liquid medium having a solubility parameter of from about 5 to about 8 at said drawing temperature, and thereafter subjecting said drawn polymer to a filamenting operation.

4. The process defined in claim 3 in which the polymer has a crystallinity of at least 90%.

5. The method of claim 3 wherein said drawing is effected at a temperature of from about 120° to about 140° C.

6. The method in accordance with claim 3 wherein said liquid medium is a paraffinic hydrocarbon.

7. The method in accordance with claim 3 wherein said liquid medium is an alkyl ester of a monocarboxylic acid.

8. The method in accordance with claim 3 wherein said liquid medium is an alkyl ether.

References Cited in the file of this patent

UNITED STATES PATENTS

| 2,336,100 | Jacque | Dec. 7, 1943 |
| 2,578,899 | Pace | Dec. 18, 1951 |
| 2,707,805 | Smith et al. | May 10, 1955 |
| 2,824,090 | Edwards et al. | Feb. 18, 1958 |
| 2,920,349 | White | Jan. 12, 1960 |

FOREIGN PATENTS

| 497,689 | Great Britain | Dec. 23, 1938 |